(12) United States Patent
Liu et al.

(10) Patent No.: US 8,906,561 B2
(45) Date of Patent: *Dec. 9, 2014

(54) BIO-FUEL CELL

(75) Inventors: Zhi-Xiang Liu, Beijing (CN); Cheng Wang, Beijing (CN); Zong-Qiang Mao, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 319 days.

This patent is subject to a terminal disclaimer.

(21) Appl. No.: 13/340,580

(22) Filed: Dec. 29, 2011

(65) Prior Publication Data
US 2013/0052546 A1 Feb. 28, 2013

(30) Foreign Application Priority Data
Aug. 30, 2011 (CN) .......................... 2011 1 0252831

(51) Int. Cl.
*H01M 8/16* (2006.01)
*H01M 4/92* (2006.01)

(52) U.S. Cl.
CPC ............... *H01M 8/16* (2013.01); *H01M 4/926* (2013.01); *Y02E 60/527* (2013.01)
USPC ............ 429/401; 429/483; 429/492; 429/497

(58) Field of Classification Search
CPC ................................ H01M 4/926; H01M 8/16
USPC .................................. 429/401, 483, 492, 497
See application file for complete search history.

(56) References Cited

U.S. PATENT DOCUMENTS

| 7,790,331 | B1 | 9/2010 | Champion et al. |
| 2010/0021774 | A1 | 1/2010 | Zhang et al. |
| 2010/0151278 | A1* | 6/2010 | Zhang et al. ................. 429/2 |
| 2010/0151297 | A1 | 6/2010 | Zhang et al. |
| 2010/0298125 | A1 | 11/2010 | Kim et al. |
| 2011/0171541 | A1 | 7/2011 | Nakagawa et al. |

FOREIGN PATENT DOCUMENTS

| JP | 2005-4967 | 1/2005 |
| JP | 2005-203332 | 7/2005 |
| JP | 2006-140103 | 6/2006 |
| JP | 2007-188810 | 7/2007 |

(Continued)

OTHER PUBLICATIONS

G.J.K. Acres, Recent advances in fuel cell technology and its Applications, Journal of Power Sources, 2001, 100, p. 60-66.

(Continued)

*Primary Examiner* — Jane Rhee
(74) *Attorney, Agent, or Firm* — Novak Druce Connolly Bove + Quigg LLP

(57) ABSTRACT

A bio-fuel cell includes at least one bio-fuel cell element. The bio-fuel cell element includes an anode, a cathode, an anode container filled with the bio-fuel, a proton exchange membrane sandwiched between the anode and the cathode, and a guide plate. The cathode includes a catalyst layer. The catalyst layer includes a number of tube carriers having electron conductibility, a number of catalyst particles uniformly adsorbed on inner wall of each of the tube carriers, and proton conductor filled in each of the tube carriers. The tube carriers cooperatively define a number of reaction gas passages. One end of each of the tube carriers connects with the proton exchange membrane. The guide plate is disposed on a surface of the cathode away from the proton exchange membrane.

20 Claims, 8 Drawing Sheets

(56) References Cited

FOREIGN PATENT DOCUMENTS

| | | |
|---|---|---|
| JP | 2009-515302 | 4/2009 |
| JP | 2010-269302 | 12/2010 |
| JP | 2011-165464 | 8/2011 |
| TW | 201008010 | 2/2010 |
| TW | 201029251 | 8/2010 |
| TW | 201029254 | 8/2010 |
| WO | WO2009/025158 | 2/2009 |

OTHER PUBLICATIONS

Recent advances in fuel cell technology and its applications, G.J.K. Acres, Journal of Power Sources, 100(2001), pp. 60-66.

* cited by examiner

BIO-FUEL CELL

CROSS-REFERENCE TO RELATED APPLICATIONS

This application claims all benefits accruing under 35 U.S.C. §119 from China Patent Application No. 201110252831.4, filed on Aug. 30, 2011, in the China Intellectual Property Office, the contents of which are hereby incorporated by reference.

BACKGROUND

1. Technical Field

The present disclosure relates to a bio-fuel cell.

2. Description of Related Art

A fuel cell is a power generating device which can convert chemical energy into electrical energy through an electrochemical reaction of a fuel and a catalyst. In a bio-fuel cell, an organic material is used as a biofuel, an enzyme is used as the catalyst. In the process of using the bio-fuel cell, the chemical energy of the organic material is directly converted into electrical energy.

The bio-fuel cell commonly includes a membrane electrode assembly including a cathode, an anode, and a proton exchange membrane sandwiched between the cathode and the anode, an anode container filled with bio-fuel, a flow guide plate disposed on a surface of the proton exchange membrane away from the cathode, and a gas supply and suction device connected with the flow guide plate. The gas supply and suction device introduce a reaction gas into the cathode and suction out a reaction product (e.g. water) from the cathode. The anode is immersed into the anode container and includes a carbon fiber paper and enzyme catalyst particles distributed on the carbon fiber paper. The cathode includes a catalyst layer and a gas diffusion layer. The catalyst layer is sandwiched between the catalyst layer and the proton exchange membrane. The catalyst layer commonly includes a catalyst, a catalyst carrier, a proton conductor, and an adhesive. In general, the catalyst carrier is carbon particles, and the catalyst is nano-scale precious metal particles uniformly dispersed in the catalyst carrier. A catalytic efficiency of the catalyst layer can influence the property of the fuel cell. The catalytic efficiency can be increased by increasing the three-phase reaction interfaces between the precious metal particles and reaction gas, proton and electrons. The protons and electrons generated by the anode, and the reaction gas introduced into the cathode need to be transferred to the surfaces of the catalyst for executing the electrochemical reaction. If the transfer passages are obstructed, the electrochemical reaction of the bio-fuel cell will be frustrated.

The catalyst layer is commonly formed on the surfaces of the gas diffusion layer and the proton exchange membrane by brush coating, spraying, or printing. The catalyst layer has a disordered stack structure composed of a plurality of aggregates. It is difficult to catalyze the electrochemical reaction because the precious metal particles are embedded in the aggregates. Thus, the utilization rate of the catalyst in the catalyst layer having the disordered stack structure is low.

What is needed, therefore, is to provide a bio-fuel cell having a high catalyst utilization rate.

BRIEF DESCRIPTION OF THE DRAWING

Many aspects of the present disclosure can be better understood with reference to the following drawings. The components in the drawings are not necessarily to scale, the emphasis instead being placed upon clearly illustrating the principles of the present embodiments.

DETAILED DESCRIPTION

Figure 1:
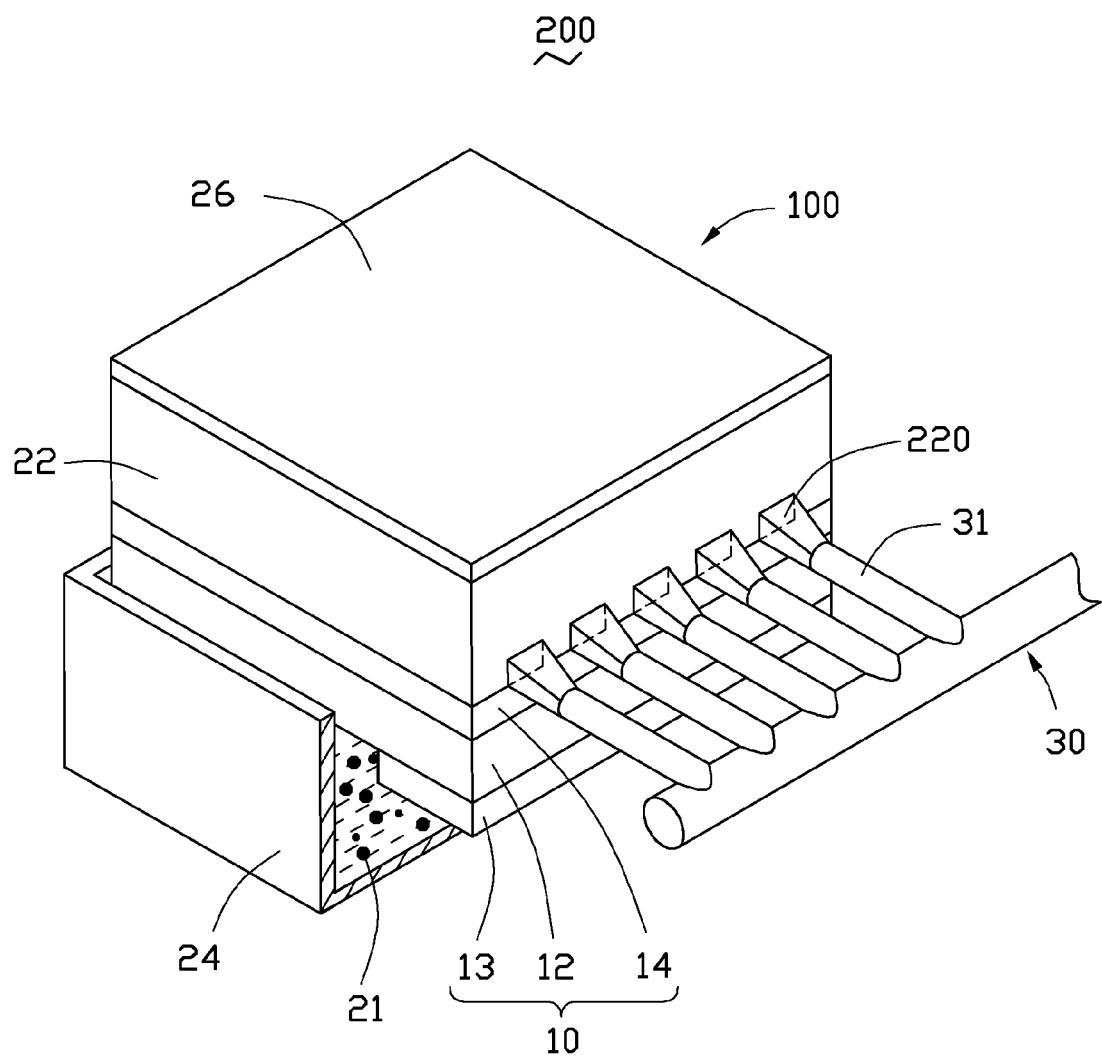
FIG. 1 is a structural view of one embodiment of a bio-fuel cell.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Referring to FIGS. 1 to 4, one embodiment of a bio-fuel cell 200 includes at least one bio-fuel cell element 100. The fuel cell element 100 includes a membrane electrode assembly 10, an anode container 24, and a guide plate 22. The membrane electrode assembly 10 includes a proton exchange membrane 12, an anode 13, and a cathode 14. The proton exchange membrane 12 is sandwiched between the anode 13 and the cathode 14. The guide plate 22 is disposed on a surface of the cathode 14 away from the proton exchange membrane 12. The anode container 24 is filled with a bio-fuel 21. The anode 13 is immersed in the bio-fuel 21 of the anode container 24.

Figure 2:
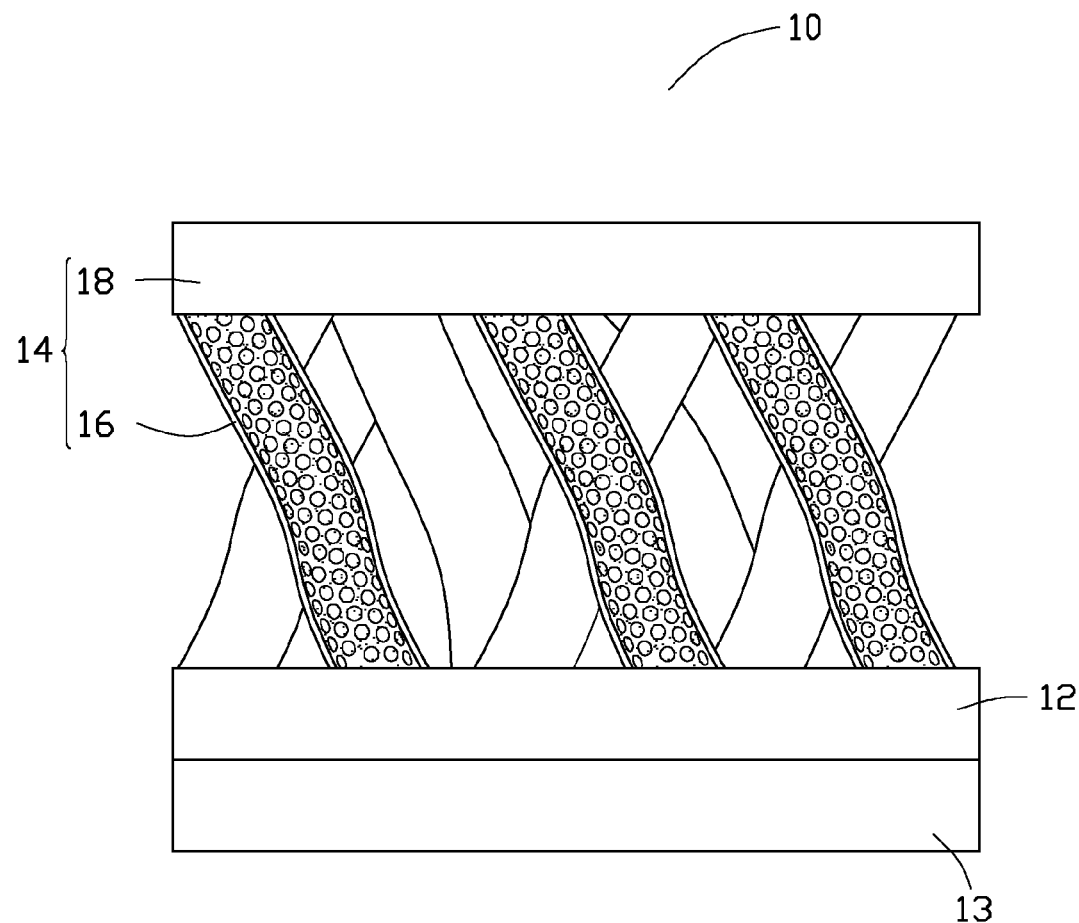
FIG. 2 is a structural view of one embodiment of a membrane electrode assembly having a network structure composed of a plurality of tube carriers intersected with each other.
Figure 3:
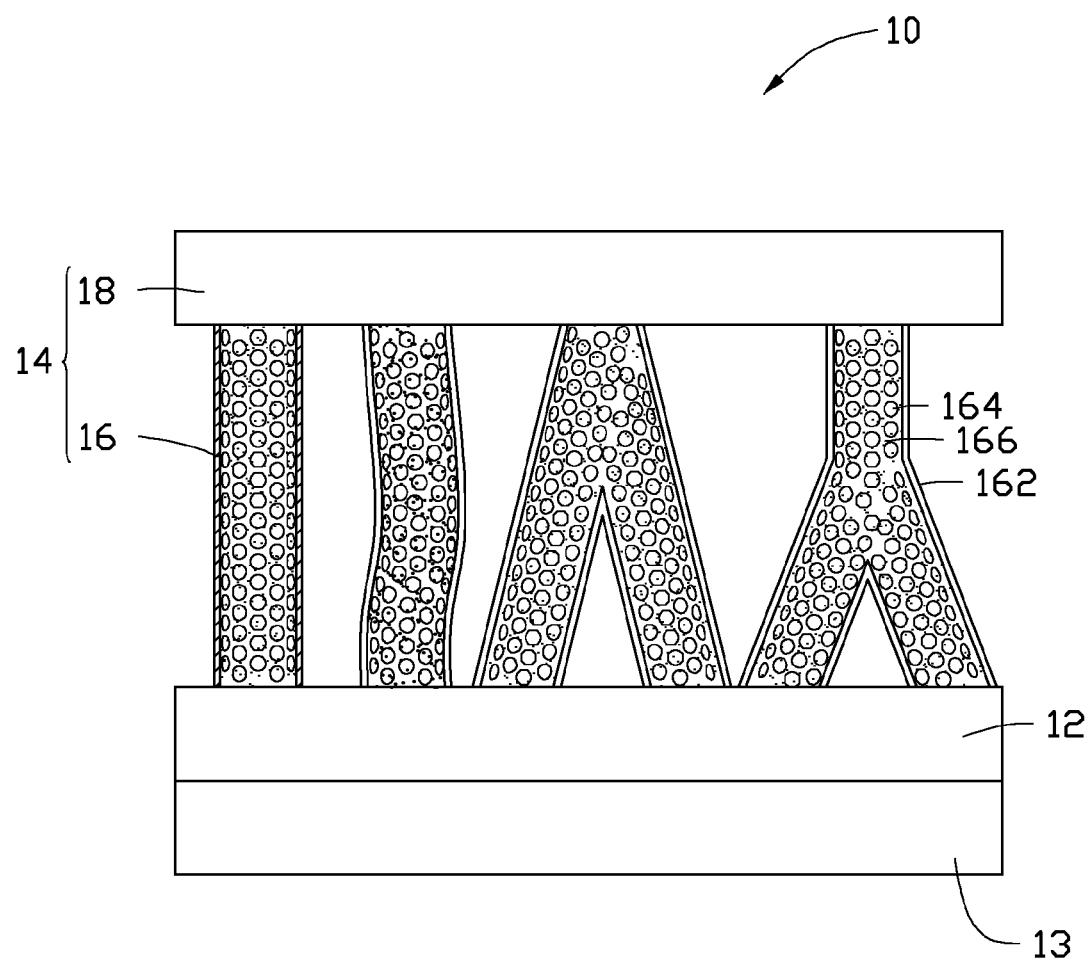
FIG. 3 is a structural view of another embodiment of a membrane electrode assembly including a plurality of tube carriers having different shapes.
Figure 4:
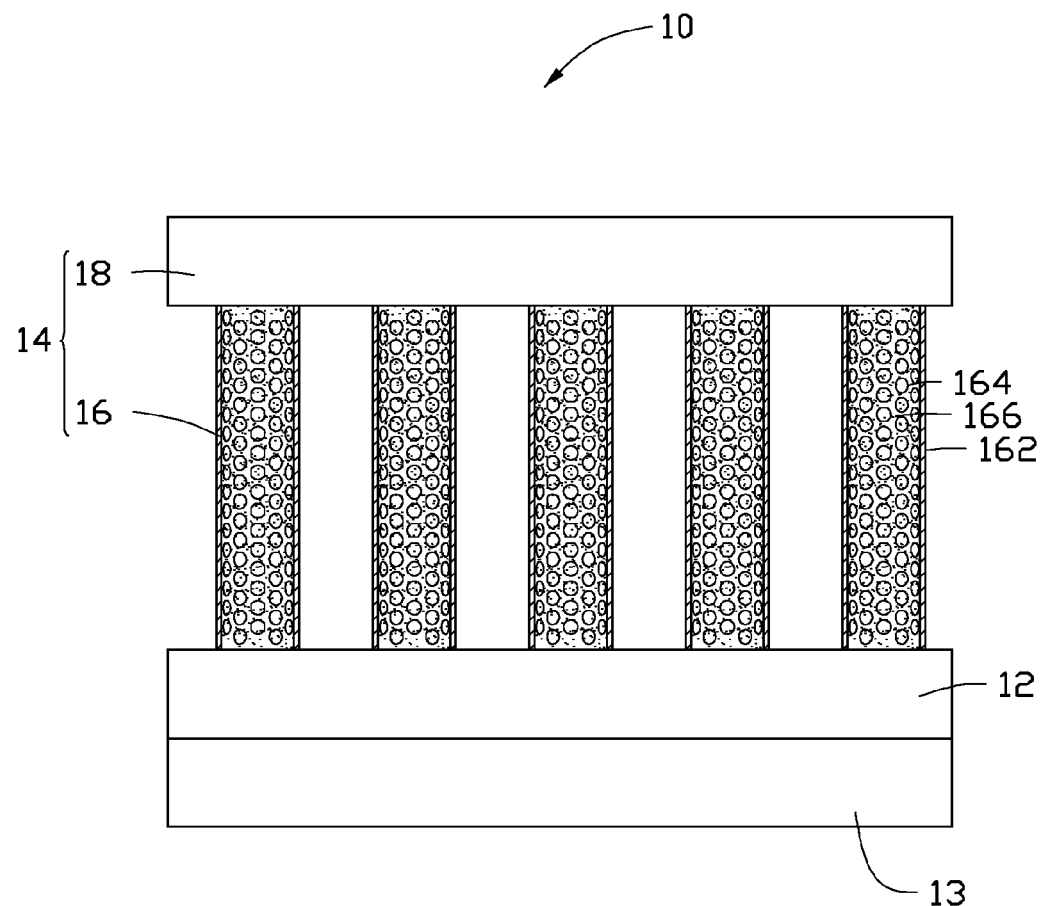
FIG. 4 is a structural view of yet another embodiment of a membrane electrode assembly including a plurality of tube carriers substantially parallel to each other and spaced from each other.

Referring to FIGS. 2 to 4, in the membrane electrode assembly 10, the cathode 14 includes a catalyst layer 16. The catalyst layer 16 is in contact with a surface of the proton exchange membrane 12. The catalyst layer 16 includes a plurality of tube carriers 162, a plurality of catalyst particles 164, and a proton conductor 166. The plurality of catalyst particles 164 are uniformly adsorbed on inner walls of the tube carriers 162. The proton conductor 166 is filled in the plurality of tube carriers 162. The plurality of tube carriers 162 are disposed on the surface of the proton exchange membrane 12 and cooperatively define a plurality of reaction gas passages. The reaction gas can directly diffuse to the surfaces of the catalyst particles 164 through the reaction gas passages. The tube carriers 162 can be a porous tube structure having electron conductibility. One end of each of the tube carriers 162 connects with the proton exchange membrane 12, by which the proton conductor 166 filled in the tube carriers 162 can be in contact with the proton exchange membrane 12.

The proton exchange membrane 12 can define passages to transfer protons between the anode 13 and the cathode 14. The proton exchange membrane 12 is disposed between the anode 13 and the cathode 14, such that the anode 13 and the cathode 14 cannot be in contact with each other. A material of the proton exchange membrane 12 can be a proton exchange resin containing sulfoacid group. The proton exchange resin can be perfluorosulfonic acid resin or sulfonate polymer having a proton exchange function or excellent thermal stability. The sulfonate polymer can be sulfonated polyether sulphone resin, sulfonated polyphenylene sulfide resin, sulfonated polybenzimidazole resin, sulfonated phosphorus enrichment nitriles resin, sulfonated polyimide resin, sulfonated polystyrene-polyethylene copolymer resin, or any combination thereof. A thickness of the proton exchange membrane 12 can be in a range from about 10 microns (μm) to 200 μm (e.g. 18 μm to 50 μm). In one embodiment, the proton exchange membrane 12 is perfluorosulfonic acid resin having a thickness of about 25 μm.

The plurality of tube carriers 162 can be used to connect the guide plate 22 with the proton exchange membrane 12. The plurality of tube carriers 162 in the catalyst layer 16 can be orderly or disorderly arranged. The plurality of reaction gas passages defined by the tube carriers 162 is a plurality of gaps defined between the tube carriers 162 and a plurality of holes defined by the tube wall of the tube carriers 162. The reaction gas can reach the tube walls of the tube carriers through the gaps. Furthermore, the reaction gas can diffuse into the tube carriers 162 to contact the catalyst particles 164 adsorbed on the inner walls of the tube carriers 162 through the holes on the tube walls. The tube carriers 162 can be spaced from each other to define the plurality of reaction gas passages between the tube carriers 162, or the tube carriers 162 can intersect each other to form a network having a plurality of holes. A shape of each of the tube carriers 162 is not limited and can be straight, curvy, "V" shaped, or "Y" shaped. Referring to FIG. 2, in one embodiment, the tube carriers 162 in membrane electrode assembly 10 intersect each other to form a network having a plurality of holes. Referring to FIG. 3, in one embodiment, the tube carriers 162 in the membrane electrode assembly 10 are spaced from each other and have different shapes. Referring to FIG. 3, in one embodiment, all the tube carriers 162 in the membrane electrode assembly 10 are straight shaped and substantially perpendicular to the surface of the proton exchange membrane 12, and the plurality of tube carriers 162 are uniformly distributed, parallel to each other, and spaced from each other.

A diameter of the tube carrier 162 can be in a range from about 10 nanometers (nm) to about 10 μm. In one embodiment, the diameter of the tube carriers 162 is in a range from about 50 nm to about 300 nm. The more the catalyst particles 164 in the catalyst layer 16 per unit volume, the larger the cross section of the proton conductor 166 filled in the tube carrier 162, the smaller the impedance of the proton conductor 166, and the higher the conductibility of the protons. The tube carrier 162 can be a carbon nanotube, titanium dioxide nanotube, zinc oxide nanotube, cobalt oxide nanotube, or vanadic oxide nanotube. If the tube carrier 162 is a carbon nanotube, the carbon nanotube can be a single-walled carbon nanotube, double-walled carbon nanotube, or multi-walled carbon nanotube. A wall thickness of the tube carrier 162 can be in a range from about 1 nm to about 50 nm. The wall thickness of the tube carrier 162 can influence the performance of the membrane electrode assembly 10. In one embodiment, the wall thickness of the tube carrier 162 is in a range from about 2 nm to about 15 nm. If the wall thickness is small, the tube carrier 162 has excellent electron conductibility, and the diffusion path through which the reaction gas diffuses in the tube carrier 162 is short. A thickness of the catalyst layer 16 can be in a range from about 1 μm to about 100 μm. A length of the tube carrier 162 is not limited. If the tube carrier 162 is straight line shaped and substantially perpendicular to the surface of the proton exchange membrane 12, the length of the tube carrier 16 is substantially equal to the thickness of the catalyst layer 16. A width of the gaps between the tube carriers 162 is not limited. If the plurality of tube carriers 162 are substantially parallel to each other and spaced from each other, a distance between the adjacent tube carriers 162 can be less than 50 μm. In one embodiment, the tube carrier 162 is a carbon nanotube composed of amorphous carbon, the length of the carbon nanotube is about 7 μm, the diameter of the carbon nanotube is about 100 nm, the wall thickness of the carbon nanotube is about 3 nm, and the distance between adjacent carbon nanotubes is about 100 nm.

The catalyst particles 164 can be precious metal particles having high catalytic activity. The catalyst particles 164 can be platinum (Pt), palladium (Pd), aurum (Au), ruthenium (Ru) or any combination thereof. In one embodiment, the catalyst particles 164 are Pt particles. In one embodiment, a diameter of the catalyst particles is in a range from about 1 nm to about 8 nm. The catalyst particles 164 are uniformly adsorbed or are adhered on the inner wall of the tube carrier 162. A quantity of the catalyst particles 164 in the cathode 14 can be less than or equal to 0.5 mg·cm$^{-2}$. In addition, the catalyst particles 164 can be uniformly and stably adsorbed on the inner walls of the tube carriers 162 and cannot easily move because the tube carriers 162 have small diameter and the walls of the tube carriers 162 have adsorbility. In one embodiment, the quantity of the catalyst particles 164 is 0.1 mg·cm$^{-2}$, and the diameter of the catalyst particles 164 is about 3 nm.

The proton conductor 166 transfers the protons and fills in the tube carriers 162. A material of the proton conductor 166 can be proton exchange resin containing sulfoacid group. The proton exchange resin can be perfluorosulfonic acid resin or sulfonate polymer having proton exchange function and excellent thermal stability. The sulfonate polymer can be sulfonated polyether sulphone resin, sulfonated polyphenylene sulfide resin, sulfonated polybenzimidazole resin, sulfonated phosphorus enrichment nitriles resin, sulfonated polyimide resin, sulfonated polystyrene-polyethylene copolymer resin, or any combination thereof. The material of the proton conductor 166 can be different from or the same as the material of the proton exchange membrane 12.

In the catalyst layer 16, the walls of the tube carriers 162 have electron conductibility, the proton conductor 166 filled in the tube carriers 162 has proton conductibility, and the catalyst particles 164 between the proton conductor 166 and the tube carriers 162 have catalytic activity. The proton exchange membrane 12 directly connects with the proton conductor 166 in the tube carriers 162. The gaps between the tube carriers 162 can provide the reaction gas passages. The proton conductor 166 cannot obstruct the reaction gas to reach the surfaces of the catalyst particles 164 adsorbed on the inner wall of the tube carriers 162.

Furthermore, each of the anode 13 and the cathode 14 can include a gas diffusion layer 18 disposed on one end of the catalyst layer 16 away from the proton exchange membrane 12. The gas diffusion layer 18 and the walls of the tube carriers 162 in the catalyst layer 16 are electrically contacted with each other. The gas diffusion layer 18 can support the catalyst layer 16, collect current, transfer gas, and expel water. A material of the gas diffusion layer 18 is porous conductive material. The gas diffusion layer 18 can be a carbon fiber paper or a carbon nanotube film comprising of a plurality of carbon nanotubes. A thickness of the gas diffusion layer 18 can be in a range from about 100 μm to about 500 μm. In addition, the tube carriers 162 in the catalyst layer 16 have electron conductibility, and the tube carriers 162 define the plurality of reaction gas passages. Thus, the gas diffusion layer 18 can be optional.

Figure 5:
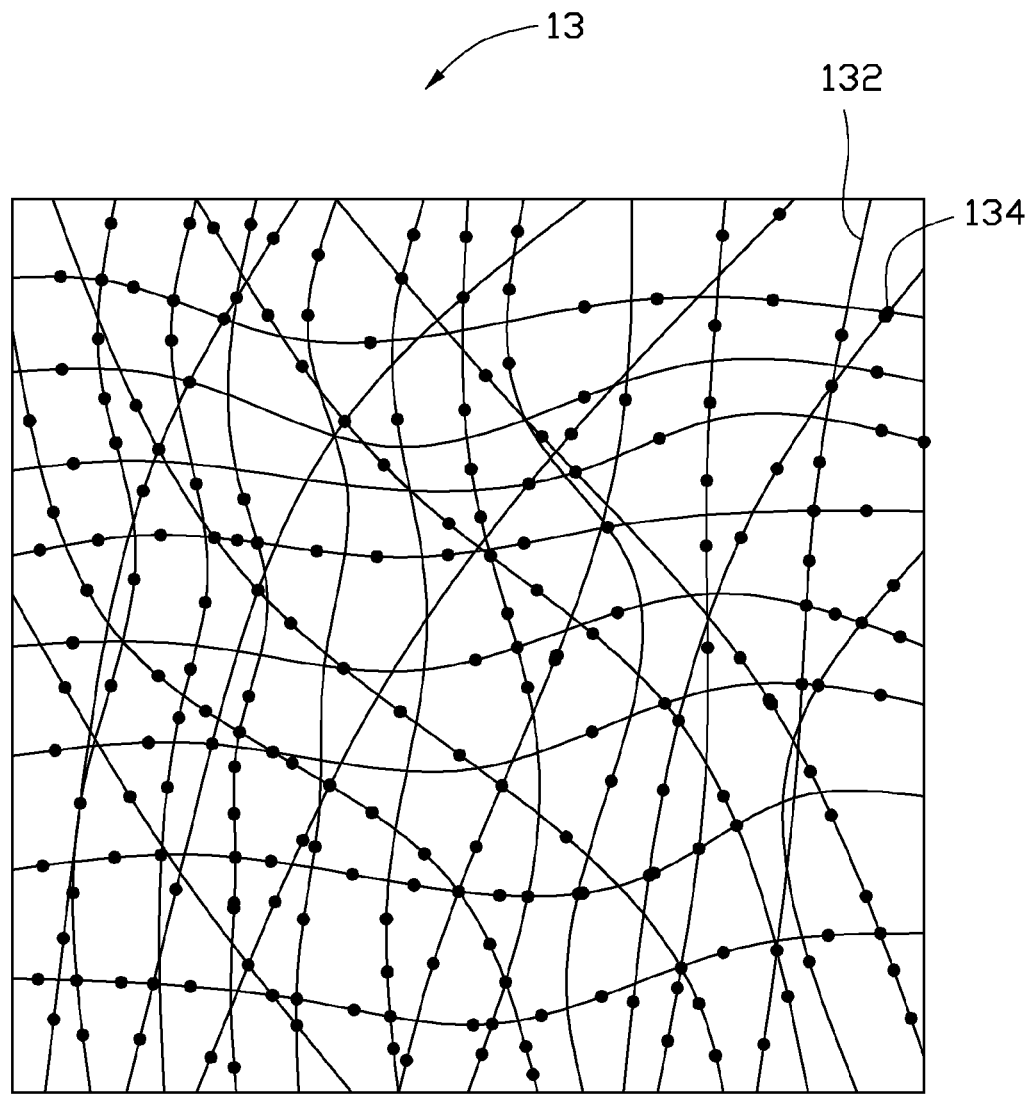
FIG. 5 is a structural view of an anode of the bio-fuel cell of FIG. 1.

Referring to FIG. 5, the anode 13 includes a catalyst carrier 132 and enzyme catalyst 134 distributed on the catalyst carrier 132. The catalyst carrier 132 directly contacts the proton exchange membrane 12. The catalyst carrier 132 can support the enzyme catalyst 134 and transfer electrons. The catalyst carrier 132 can be graphite, carbon fiber paper, or carbon nanotube film including the carbon nanotubes. The particles of enzyme catalyst 134 are uniformly adsorbed on the catalyst carrier 132. The enzyme catalyst 134 can catalyze the bio-fuel. The enzyme catalyst 134 can be oxidase containing prosthetic group FAD, or dehydrogenize containing prosthetic group $NAD(P)^+$. In one embodiment, the catalyst carrier 132 is a carbon nanotube film consisting of a plurality of entangled carbon nanotubes, the enzyme catalyst 134 is glucose oxidase. The anode container 24 is filled with the bio-fuel 21. The anode 13 is immersed in the bio-fuel of the anode container 24. In one embodiment, the bio-fuel 21 is a glucose solution. Furthermore, the anode 13 further includes a proton conductor. The proton conductor, the catalyst carrier 132, and the enzyme catalyst 134 are uniformly mixed. A material of the proton conductor can transfer the protons and can be the same as or different from the material of the proton conductor 166 of the cathode 14.

A structure of the anode 13 can be similar to the structure of the cathode 14. The structure of the catalyst carrier 132 can be the same as the structure of the tube carriers 162 in the cathode 14. The enzyme catalyst 134 can be adsorbed on inner walls of the catalyst carrier 132. In this embodiment, the anode 13 can include the catalyst carrier 132, the enzyme catalyst 134, and the proton conductor. The catalyst carrier 132 is disposed on the surface of the proton exchange membrane 12. The enzyme catalyst 134 is uniformly adsorbed on the inner walls of the catalyst carrier 132. The proton conductor is filled in the catalyst carrier 132. The catalyst carrier 132 defines a plurality of bio-fuel passages to transfer the bio-fuel to the surface of the enzyme catalyst 134. The catalyst carrier 132 can be porous tube carriers having electron conductibility. One end of the catalyst carriers 132 connects with the proton exchange membrane 12, by which the proton conductor filled in the tube carriers 132 can be in contact with the proton exchange membrane 12.

The guide plate 22 is disposed on a surface of the cathode 14 away from the proton exchange membrane 12. If the cathode 14 includes the gas diffusion layer 18, the guide plate 22 is disposed on the gas diffusion layer 18 of the cathode 14. The guide plate 22 can be used to introduce the reaction gas and expel out reaction resultant or water. The guide plate 22 has at least one flow guide groove 220 on the surface near the proton exchange membrane 12. The flow guide groove 220 can introduce reaction gas into the cathode 14, and expel out the reaction resultant or water from the cathode 14. A shape of the flow guide groove 220 is not limited. The flow guide groove 220 can be arranged to connect with the cathode 14. In one embodiment, the flow guide groove 220 is a rectangular groove. In addition, the guide plate 22 electrically contacts with the cathode 14, and capable of transferring the electrons generated by the membrane electrode assembly 10 to an external circuit. A material of the guide plate 22 can be conductive material. The conductive material can be metal or conductive carbon material. The metal can be aluminum, copper, or iron.

Furthermore, the bio-fuel cell element 100 can include a gas supply and suction device 30. The gas supply and suction device 30 connects with the flow guide groove 220 of the guide plate 22. The gas supply and suction device 30 includes a blower (not shown), pipes 31, and a valve (not shown). The blower of the gas supply and suction device 30 can be connected with the flow guide grooves 220 of the guide plate 22 by the pipes 31. The blower can be used to provide the reaction gas. The reaction gas can include fuel gas and oxidizing agent gas. In one embodiment, the oxidizing agent gas is oxygen or air.

Furthermore, the bio-fuel cell element 100 can include a current collecting plate 26 disposed on a surface of the guide plate 22 away from the proton exchange membrane 12 and electrically contacting with the guide plate 22. The current collecting plate 26 can collect and transfer electrons. A material of the current collecting plate 26 can be a conductive material. The conductive material can be metal or conductive carbon material. The metal can be aluminum, copper, or iron.

In the working process of the bio-fuel cell 200, a reaction of bio-fuel (e.g. glucose) in the anode container 24 can be executed under the catalysis of the enzyme catalyst 134. An equation of the reaction can be as follows: glucose→gluconic acid+$2H^+$+2 e. The hydrogen ions produced by the above reaction are transferred to the proton exchange membrane 12 through the glucose solution in the anode container 24, and then transferred to the cathode 14 contacting the proton exchange membrane 12. In addition, the electrons produced by the above reaction can be transferred to the external circuit, and then transferred to the cathode 14 through the external circuit.

In addition, if the structure of the anode 13 is similar to the structure of the cathode 14, the bio-fuel 21 can be sufficiently diffused to the surface of the enzyme catalyst 134. In one embodiment, the catalyst carrier 132 includes a plurality of carbon nanotubes. The bio-fuel 21 can sufficiently diffuse to the position of outer walls of the carbon nanotubes through the gaps between the carbon nanotubes, and then rapidly diffuse in the inner walls of the carbon nanotubes through holes on the wall of the carbon nanotubes. The enzyme catalyst 134 is uniformly adsorbed on the inner walls of the carbon nanotubes, so that the bio-fuel diffused in the carbon nanotubes can sufficiently contact the enzyme catalyst 134. The protons and the electrons can be formed by the reaction of the bio-fuel under the catalysis of the enzyme catalyst 134. The protons can be transferred to the proton exchange membrane 12 through the proton conductor filled in the carbon nanotubes, and transferred to the cathode 14 contacting the proton exchange membrane 12. The electrons produced can be transferred to the external circuit by the walls of the carbon nanotubes because the amorphous carbon has electron conductibility.

On the other end of the bio-fuel cell 200, the oxidizing agent gas (e.g. oxygen gas, $O_2$) is introduced into the cathode 14 by the supply and suction device 30 through the flow guide groove 220 of the guide plate 22. The oxygen is in contact with the catalyst layer 16 through the gas diffusion layer 18. The electrons produced in the anode 13 are transferred to the current collecting plate 22 by the external circuit, and the current collecting plate 22 transfers the electrons to the cathode 14. In one embodiment, the tube carriers 162 in the catalyst layer 16 are carbon nanotubes. Specifically, the oxygen gas is diffused to the catalyst layer 16 through the gas diffusion layer 18. In the catalyst layer 16, the oxygen gas can rapidly diffuse through the gaps defined by the plurality of carbon nanotubes. Furthermore, the oxygen gas can rapidly diffuse in the carbon nanotubes through the holes on the walls of the carbon nanotubes composed of porous amorphous carbon. Thus, the oxygen gas can directly contact the catalyst particles 164 adsorbed on the walls of the carbon nanotubes.

The electrons can be transferred to the surfaces of the catalyst particles 164 through the porous amorphous carbon of the carbon nanotubes. The hydrogen ions produced in the anode 13 can be transferred to the surfaces of the catalyst particles 164 through the proton conductor 166 directly contacted with the proton exchange membrane 12. Thus, the oxygen gas, the hydrogen ions, and the electrons are in contact with the catalyst particles 164. A reaction of the oxygen gas, the hydrogen ions, and the electrons can be executed under the catalysis of the catalyst particles 164. An equation of the reaction can be as follows: $\frac{1}{2}O_2 + 2H^+ + 2e^- \rightarrow H_2O$. The water produced by the above reaction can diffuse to the gaps between the carbon nanotubes through the walls of the carbon nanotubes, and then diffuse to the gas diffusion layer 18 and flow out the fuel cell 100 by the flow guide grooves 220 of the guide plate 22.

In the above use process of the bio-fuel cell 200, an electric potential difference is formed between the anode 13 and the cathode 14. If a load is connected with the external circuit, a current will be formed. In addition, the catalyst particles 164 in the cathode 14 are uniformly and stably adsorbed on the inner walls of the carbon nanotubes. The proton conductor 166 is filled in the carbon nanotube. Thus, the proton conductor 166 cannot obstruct the reaction gas to reach the surfaces of the catalyst particles 164, and the oxygen, the hydrogen ions, and the electrons can sufficiently contact with the catalyst particles 164. The utilization rate of the catalyst particles 164 can reach about 100%.

Figure 6:
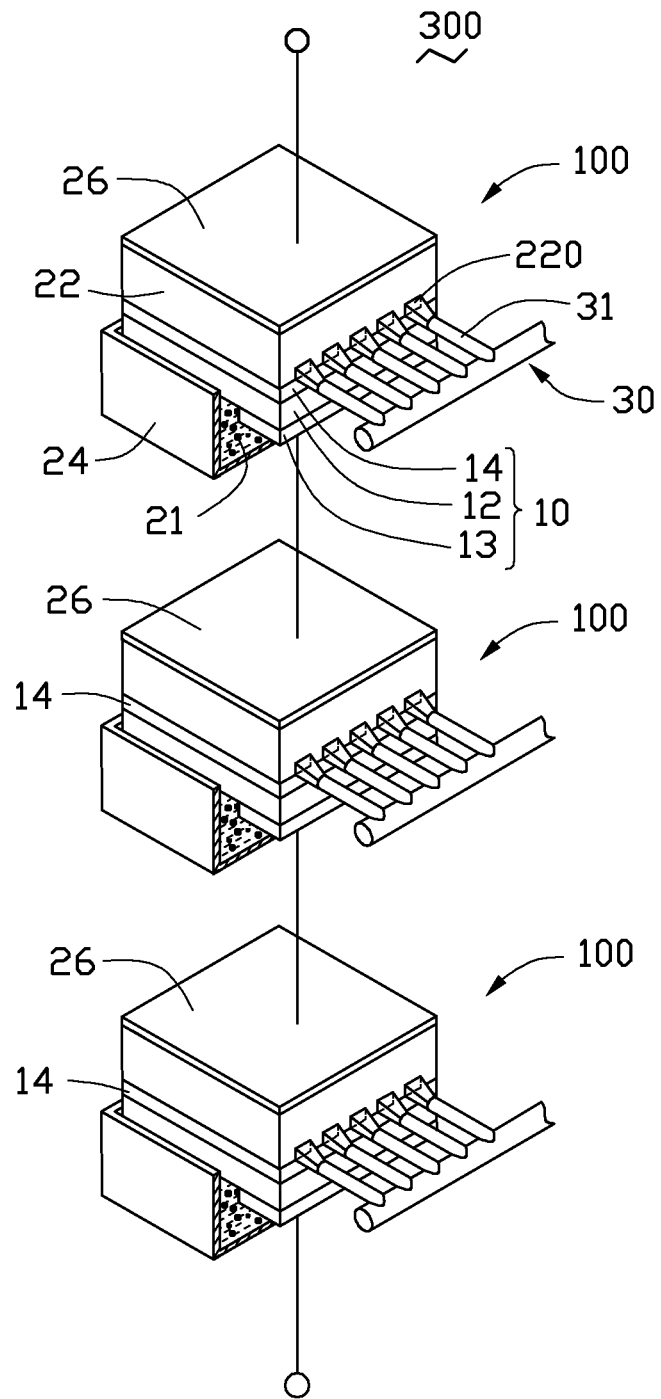
FIG. 6 is a structural view of another embodiment of a bio-fuel cell.

Referring to FIG. 6, a bio-fuel cell 300 of another embodiment includes a plurality of bio-fuel cell elements 100 connected with each other in series. The anode 13 of each bio-fuel cell element 100 is electrically connected with the cathode 14 of another bio-fuel cell element 100. In one embodiment, the anode 13 of each bio-fuel cell element 100 is electrically connected with the guide plate 22 of another bio-fuel cell element 100 by a conductive wire. The plurality of bio-fuel cell elements 100 are connected in series.

If the plurality of bio-fuel cell elements 100 is electrically connected with each other in series, the output voltage of the bio-fuel cell 300 is a summation of the output voltage of the plurality of bio-fuel cell elements 100.

Figure 7:
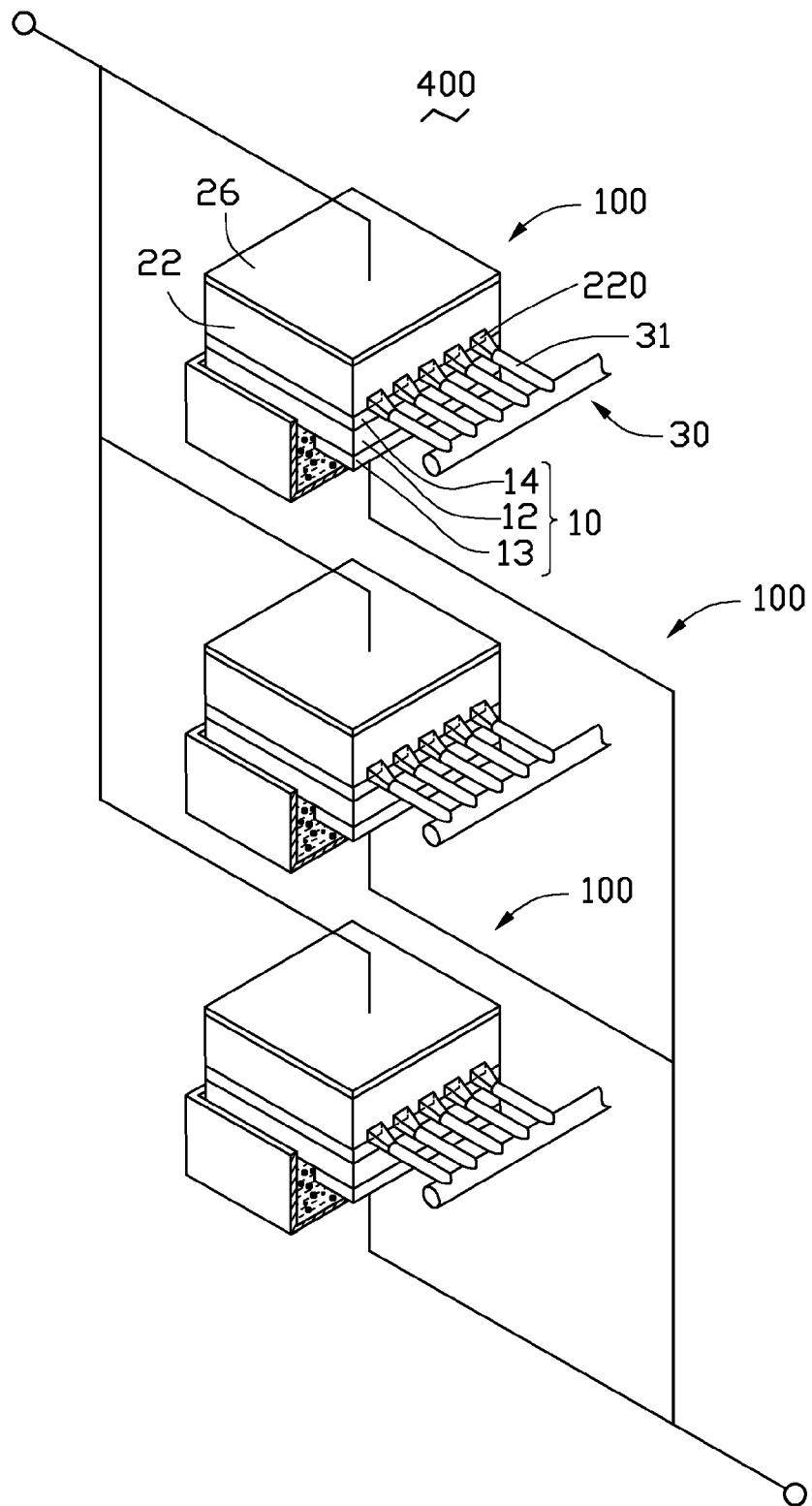
FIG. 7 is a structural view of yet another embodiment of a bio-fuel cell.

Referring to FIG. 7, another embodiment of a bio-fuel cell 400 includes a plurality of bio-fuel cell elements 100 connected with each other in parallel. The anodes 13 of the plurality of bio-fuel cell elements 100 can be electrically connected with each other. The cathodes 14 of the plurality of bio-fuel cell elements 100 can be electrically connected with each other. In one embodiment, the current collecting plates 26 or the guide plates 22 electrically connected with the cathodes 14 of the plurality of bio-fuel cell elements 100 are electrically connected with each other by conductive wires, and the anodes 13 of the plurality of bio-fuel cell elements 100 are electrically connected with each other by conductive wires. The output voltage of the bio-fuel cell 400 is the output voltage of each bio-fuel cell element 100. The output current of the bio-fuel cell 400 is a summation of the output current of the plurality of bio-fuel cell elements 100.

Figure 8:
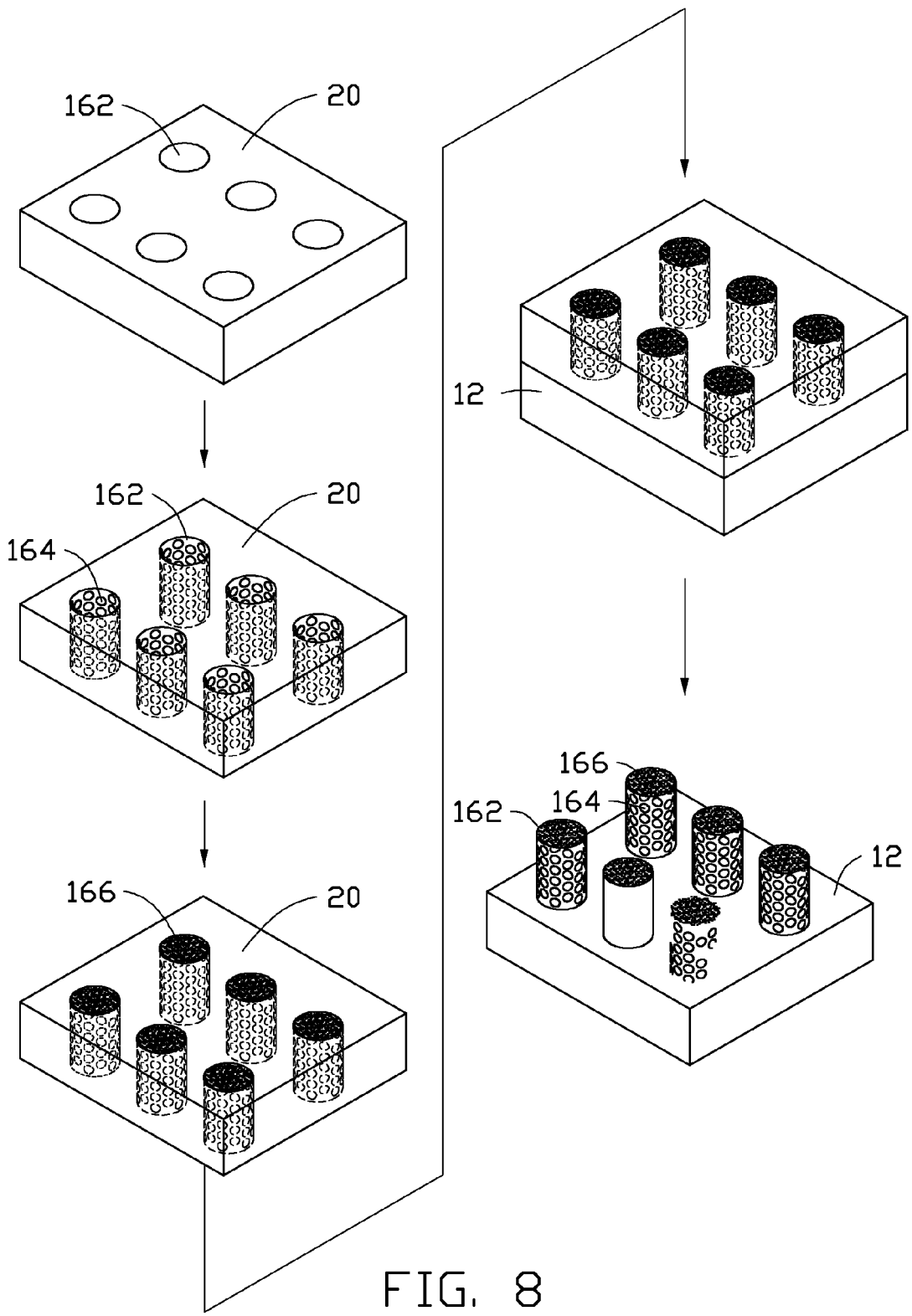
FIG. 8 is a schematic view of a process for making the cathode of the bio-fuel cell.

Referring to FIG. 8, a method for making the cathode 14 includes the following steps:

S1, providing a porous template 20 having a plurality of holes and the proton exchange membrane 12;
S2, forming the tube carriers 162 having electron conductibility in the holes of the porous template 20;
S3, uniformly adsorbing a plurality of catalyst particles 164 on the inner walls of the tube carriers 162;
S4, filling the proton conductor 166 in the tube carriers 162 adsorbing the catalyst particles 164;
S5, disposing the proton exchange membrane 12 on the porous templates 20 to form a laminated structure, and hot pressing the laminated structure;
S6, removing the porous templates 20 from the laminated structure, thereby forming the cathode 14, wherein the proton conductor 166 is filled in the tube carriers 162 adsorbing the catalyst particles 164, first ends of the tube carriers 162 are connected with the proton exchange membrane 12, whereby the proton conductor 166 filled in the tube carriers 162 directly contacts the proton exchange membrane 12.

In the step S1, a material of the porous template 20 is not limited and can form the tube carriers 162. The porous template 20 can be an alumina template or a silicon dioxide template. In one embodiment, the porous template 20 is an alumina template. The tube carriers 162 formed in the holes of the porous template 20 can define a plurality of reaction gas passages. A shape, a diameter, and the location of the holes of the porous template 20 can be set according to the shape, the diameter, and the location of the desired tube carriers 162. If the tube carriers 162 are to be uniformly distributed, substantially parallel to each other, and spaced from each other, the holes of the porous template 20 are also uniformly distributed, substantially parallel to each other, and spaced from each other. If the tube carriers 162 are to be disorderly distributed, the holes of the porous template 20 are also disorderly distributed. The porous template 20 has two opposite surfaces. A plurality of openings exists on at least one surface of the porous template 20 to expose the plurality of holes. One opening corresponds to one hole. In one embodiment, the holes of the porous template 20 extend from one surface to the other surface of the porous template 20. A diameter of the hole of the porous template 20 can be in a range from about 10 nm to about 10 μm. In one embodiment, the diameter of the hole of the porous template 20 is in a range from about 50 nm to about 300 nm. In one embodiment, the holes of the porous template 20 are uniformly distributed, substantially parallel to each other, and spaced from each other, the holes are straight line shaped, a distance between the adjacent holes is in a range from about 10 nm to about 50 μm. A thickness of the porous template 20 can be in a range from about 1 μm to about 100 μm. In one embodiment, the diameter of the holes of the porous template 20 is about 100 nm, the distance between the adjacent holes is about 100 nm, and the thickness of the porous template 20 is about 7 μm.

In the step S2, the tube carriers 162 can be carbon nanotubes, titanium dioxide nanotubes, zinc oxide nanotubes, cobalt oxide nanotubes, or vanadic oxide nanotubes. The tube carriers 162 can be formed in the holes by vaporization method, chemical vapor deposition, sol-gel method, and immersing method.

In one embodiment, the tube carriers 162 are formed by the immersing method. The immersing method includes the following steps: S11, providing a carbon source compound solution and immersing the porous template 20 in the carbon source compound solution; and S12, removing the porous template 20 from the carbon source compound solution, and annealing the porous template 20 to form the carbon nanotubes in the holes of the porous template 20.

In the step S11, the carbon source compound solution is formed by dissolving a carbon source compound in a solvent. In one embodiment, the carbon source compound is dissolved in water or volatile organic solvent. The water can be distilled water or deionized water. The volatile organic solvent can be ethanol, propyl alcohol, or acetone. The carbon source compound can be decomposed to form carbon by annealing. In one embodiment, the carbon source compound is decomposed to form amorphous carbon. The carbon source compound can be oxalic acid, sucrose, glucose, phenolic resin, polyacrylic acid, polyacrylonitrile, polyoxyethylene, or polyvinyl alcohol. If a concentration of the carbon source compound solution is too large, the carbon source compound solution cannot sufficiently immerse in the holes of the porous template 20. If the concentration of the carbon source compound solution is too small, a viscosity of the carbon source compound solution is too small and the carbon nanotubes cannot be sufficiently formed. In addition, a porosity of the tube carriers 162 can be influenced by the concentration of the carbon source compound solution. If the concentration of the carbon source compound solution is small, the porosity of the tube carriers 162 is large. If the concentration of the carbon source compound solution is large, the porosity of the tube carriers 162 is small. In one embodiment, the concentration of the carbon source compound solution is in a range from about 0.05 g/mL to about 1 g/mL. The porous template 20 can be immersed in the carbon source compound solution for about 5 minutes to about 5 hours, so that the carbon source compound solution can sufficiently immerse in the holes of the porous template 20. In one embodiment, the alumina template is immersed in the oxalic acid solution having the concentration of 0.2 g/mL for about 1 hour. In addition, the immersing period can be decreased by applying a pressure on the carbon source compound solution.

In the step S12, the porous template 20 can be further washed by water or volatile organic solvent and dried, after the porous template 20 is taken out from the carbon source compound solution. Specifically, the washed porous template 20 can be heated under vacuum. A heating temperature can be in a range from about 60° C. to about 100° C. A heating period can be in a range from about 30 minutes to about 6 hours. In one embodiment, the washed porous template 20 is heated to about 80° C. for about 3 hours. The porous template 20 can be annealed by the following steps: disposing the porous template 20 in the heating stove under protective atmosphere; calcining the porous template 20 to a predetermined temperature, thereby decomposing the carbon source compound to form carbon nanotubes composed of amorphous carbon. The calcining period and the calcining temperature can be set according to the kinds of the carbon source compound. In one embodiment, the carbon source compound is oxalic acid, the porous template 20 is calcined to about 100° C. to about 150° C. under a heating speed of about 1° C./minutes to about 5° C./minutes. The temperature of the porous template 20 is kept at about 100° C. to about 150° C. for about 1 hour to about 3 hours. The porous template 20 is then continuously calcined to about 400° C. to about 600° C. at a rate of about 1° C./minutes to about 5° C./minutes. The temperature of the porous template 20 is kept at about 400° C. to about 600° C. for about 2 hours to about 8 hours. The porous template 20 is then cooled to room temperature.

In the step S3, the catalyst particles 164 can be precious metal particles having high catalytic activity. The material of the catalyst particles 164 can be Pt, Pd, Au, or Ru. In one embodiment, the catalyst particles 164 are Pt particles. The catalyst particles 164 can be formed by the following immersing the porous template 20 defining the tube carriers 162 in a solution containing catalyst ions; and reducing the catalyst ions to form the catalyst particles 164 uniformly adsorbed on the inner walls of the tube carriers 162. In one embodiment, the Pt catalyst particles are formed by the following steps: S21, providing a platinic chloride ($H_2PtCl_6$) solution, and immersing the porous template 20, having the tube carriers 162 formed therein, in the $H_2PtCl_6$ solution, wherein a PH value of $H_2PtCl_6$ solution is adjusted to alkalescence; S22, adding a reduction object into the $H_2PtCl_6$ solution to form a mixture, and heating the mixture to cause a redox reaction between the $H_2PtCl_6$ and the reduction object, thereby forming Pt catalyst particles on the tube carriers 162.

In the step S21, the $H_2PtCl_6$ solution is formed by dissolving the $H_2PtCl_6$ in distilled water or volatile organic solvent. A concentration of the $H_2PtCl_6$ solution can be set according to the quantity of the formed catalyst particles 164. A molar concentration of the $H_2PtCl_6$ solution can be in a range from about 0.01 mol/L to about 0.1 mol/L. In one embodiment, the molar concentration of the $H_2PtCl_6$ solution is 0.05 mol/L. The PH value of the $H_2PtCl_6$ solution can be adjusted by dissolving an alkaline compound in the $H_2PtCl_6$ solution. The alkaline compound can be $Na_2CO_3$, NaOH, or KOH. The PH value of the $H_2PtCl_6$ solution can be adjusted in a range from about 8 to about 9. In the step S22, the reduction object can be formaldehyde (HCHO), formic acid (HCOOH), or potassium borohydride ($KBH_4$). A quantity of the reduction object can be set to reduce the Pt ions of the $H_2PtCl_6$ solution into metal Pt particles. A heating temperature can be in a range from about 50° C. to about 70° C. Furthermore, a protective gas can be introduced during the heating process. The protective gas can be nitrogen gas or argon gas. The diameter of the formed catalyst particles 164 can be in a range from about 1 nm to about 8 nm. After step S22, the porous template 20 can be taken out, washed by the distilled water or volatile organic solvent, and then dried.

In the step S4, the proton conductor 166 can be fused into liquid, or be dissolved in a solvent to form a proton conductor solution. The proton conductor 166 can be filled in the tube carriers 162 by two methods. The first method is flatly disposing the porous template 20 on the fused proton conductor 166 or the proton conductor solution. The second method is pouring the fused proton conductor 166 or the proton conductor solution on the surface exposing the holes of the porous template 20.

In the first method, the surface exposing the holes of the porous template 20 is in contact with the fused proton conductor 166 or the proton conductor solution, and the fused proton conductor 166 or the proton conductor solution is gradually immersed into the tube carriers 162 in the holes of the porous template 20 under a capillary force. In the second method, the fused proton conductor 166 or the proton conductor solution gradually flows into the tube carriers 162 in the holes of the porous template 20. A vacuum pump can be used to pump the fused proton conductor 166 or the proton conductor solution, by which the fused proton conductor 166 or the proton conductor solution can rapidly flow in the tube carriers 162 in the holes of the porous template 20.

If the tube carriers 162 in the holes of the porous template 20 are filled with the fused proton conductor 166, the fused proton conductor 166 can be solidified by standing in room temperature or low temperature heating for a predetermined period. If the tube carriers 162 in the holes of the porous template 20 are filled with the proton conductor solution, the solvent in the proton conductor solution can be filtrated out, and the remaining proton conductor 166 can then be solidified by standing in room temperature or low temperature heating for a predetermined period. In addition, the porous template 20 filled with the proton conductor 166 can be washed by the distilled water or volatile organic solvent, and then vacuum dried. In one embodiment, the proton conductor 166 is perfluorosulfonic acid resin. Before filling the perfluorosulfonic acid resin in the tube carriers 162 in the holes of the porous template 20, the perfluorosulfonic acid resin is heated to a molten state.

In the step S5, after hot pressing the laminated structure, the laminated structure is integrated together and cannot be separated. The proton conductor 166 in the tube carriers 162 is directly connected with the proton exchange membrane 12.

In the step S6, the porous templates 20 can be removed by corrosion technology. In one embodiment, the porous template 20 is an alumina template, the laminated structure is immersed in a NaOH water solution or a $H_3PO_4$ water solution to erode the alumina template. In one embodiment, a molar concentration of the NaOH water solution is in a range from about 0.5 mol/L to about 4 mol/L. A mass ratio of the $H_3PO_4$ water solution is in a range from about 3% to about 15%. After removing the alumina template, the orderly oriented tube carriers 162 are disposed on the surface of the proton exchange membrane 12.

Depending on the embodiment, certain steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A bio-fuel cell comprising:
   at least one bio-fuel cell element comprising:
      a membrane electrode assembly comprising:
         an anode and a cathode, the cathode comprising a catalyst layer comprising a plurality of tube carriers having electron conductibility, a plurality of catalyst particles uniformly adsorbed on a wall of each of the plurality of tube carriers, and a proton conductor filled in each of the plurality of tube carriers, the plurality of tube carriers cooperatively defining a plurality of reaction gas passages for transferring reaction gas to surfaces of the plurality of catalyst particles; and
         a proton exchange membrane sandwiched between the anode and the cathode, a first end of each of the plurality of tube carriers being connected with the proton exchange membrane, the proton exchange membrane being in contact with the proton conductor filled in each of the plurality of tube carriers;
      a guide plate disposed on a surface of the cathode away from the proton exchange membrane; and
      an anode container filled with biofuel, wherein the anode is immersed in the biofuel of the anode container.

2. The bio-fuel cell as claimed in claim 1, wherein the plurality of reaction gas passages comprise a plurality of gaps defined between the plurality of tube carriers.

3. The bio-fuel cell as claimed in claim 1, wherein the plurality of reaction gas passages comprise a plurality of holes defined in the wall of each of the plurality of tube carriers.

4. The bio-fuel cell as claimed in claim 1, wherein the plurality of tube carriers are disorderly arranged.

5. The bio-fuel cell as claimed in claim 1, wherein a shape of each of the plurality of tube carriers in the catalyst layer is straight, curvy, V-shaped, or Y-shaped.

6. The bio-fuel cell as claimed in claim 1, wherein the plurality of tube carriers is spaced from each other.

7. The bio-fuel cell as claimed in claim 6, wherein the plurality of tube carriers is substantially parallel to each other and substantially perpendicular to a surface of the proton exchange membrane.

8. The bio-fuel cell as claimed in claim 7, wherein a distance between every two adjacent tube carriers of the plurality of tube carriers is less than 50 μm.

9. The bio-fuel cell as claimed in claim 1, wherein the plurality of tube carriers are selected from the group consisting of carbon nanotubes, titanium dioxide nanotubes, zinc oxide nanotubes, cobalt oxide nanotubes, vanadic oxide nanotubes, and any combination thereof.

10. The bio-fuel cell as claimed in claim 1, wherein the plurality of tube carriers are carbon nanotubes composed of amorphous carbon.

11. The bio-fuel cell as claimed in claim 1, wherein a diameter of each of the plurality of tube carriers is in a range from about 10 nm to about 10 μm.

12. The bio-fuel cell as claimed in claim 1, wherein a wall thickness of each of the plurality of tube carriers is in a range from about 2 nm to about 15 nm.

13. The bio-fuel cell as claimed in claim 1, wherein the plurality of catalyst particles are selected from the group consisting of Pt particles, Pd particles, Au particles, Ru particles, and any combination thereof.

14. The bio-fuel cell as claimed in claim 1, further comprising a gas diffusion layer disposed on a second end of each of the plurality of tube carriers, and the gas diffusion layer is electrically contacting the walls of the plurality of tube carriers.

15. The bio-fuel cell as claimed in claim 1, wherein at least one flow guide groove is defined on a surface of the guide plate near the proton exchange membrane, the at least one bio-fuel cell element further comprises a gas supply and suction device connected with the at least one flow guide groove of the guide plate to introduce the reaction gas into the cathode.

16. The bio-fuel cell as claimed in claim 1, further comprising a current collecting plate used to collect and conduct electrons, wherein the current collecting plate electrically contacts the guide plate.

17. The bio-fuel cell as claimed in claim 1, wherein the anode comprises a catalyst carrier and an enzyme catalyst distributed on the catalyst carrier.

18. A bio-fuel cell comprising: a plurality of bio-fuel cell elements connected with each other, each of the plurality of bio-fuel cell elements comprising:
   a membrane electrode assembly comprising:
      an anode and a cathode, the cathode comprising a catalyst layer comprising a plurality of tube carriers having electron conductibility, a plurality of catalyst particles uniformly adsorbed on an inner wall of each of the plurality of tube carriers, and a proton conductor filled in each of the plurality of tube carriers, the plurality of tube carriers cooperatively defining a plurality of reaction gas passages for transferring reaction gas to surfaces of the plurality of catalyst particles; and
      a proton exchange membrane sandwiched between the anode and the cathode, one end of each of the plurality of tube carriers being connected with the proton exchange membrane, the proton exchange membrane being in contact with the proton conductor filled in each of the plurality of tube carriers;

a guide plate disposed on a surface of the cathode away from the proton exchange membrane; and an anode container filled with biofuel, the anode being immersed in the biofuel of the anode container.

19. The bio-fuel cell as claimed in claim 18, wherein the plurality of bio-fuel cell elements connected with each other in series, and the anode of one bio-fuel cell element is electrically connected with the cathode of another bio-fuel cell element.

20. The bio-fuel cell as claimed in claim 18, wherein the plurality of bio-fuel cell elements connected with each other in parallel, anodes of the plurality of bio-fuel cell elements are electrically connected with each other, and cathodes of the plurality of bio-fuel cell elements are electrically connected with each other.

* * * * *